(12) United States Patent
Aramaki

(10) Patent No.: US 11,065,511 B2
(45) Date of Patent: Jul. 20, 2021

(54) GOLF CLUB HEAD AND MANUFACTURING METHOD THEREOF

(71) Applicant: Sumitomo Rubber Industries, Ltd., Kobe (JP)

(72) Inventor: Tomotaka Aramaki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/025,671

(22) Filed: Sep. 18, 2020

(65) Prior Publication Data

US 2021/0086039 A1 Mar. 25, 2021

(30) Foreign Application Priority Data

Sep. 20, 2019 (JP) .............................. JP2019-171715

(51) Int. Cl.
*A63B 53/04* (2015.01)
*A63B 53/06* (2015.01)
*B23K 26/24* (2014.01)

(52) U.S. Cl.
CPC ...... *A63B 53/0433* (2020.08); *A63B 53/0466* (2013.01); *B23K 26/24* (2013.01)

(58) Field of Classification Search
CPC .............................................. A63B 2053/0491
USPC ....................................................... 473/335
See application file for complete search history.

(56) References Cited

U.S. PATENT DOCUMENTS

| 4,059,270 | A | * | 11/1977 | Sayers | .................. | A63B 60/46 |
| | | | | | | 473/409 |
| 5,913,735 | A | * | 6/1999 | Kenmi | .................. | A63B 60/00 |
| | | | | | | 473/338 |
| 5,967,904 | A | * | 10/1999 | Nagai | .................... | A63B 53/04 |
| | | | | | | 473/345 |
| 6,206,789 | B1 | * | 3/2001 | Takeda | ................... | A63B 60/00 |
| | | | | | | 473/335 |
| 6,371,868 | B1 | * | 4/2002 | Galloway | .............. | A63B 60/00 |
| | | | | | | 473/324 |

(Continued)

FOREIGN PATENT DOCUMENTS

| JP | 06121848 A | * | 5/1994 |
| JP | 06296716 A | * | 10/1994 |

(Continued)

*Primary Examiner* — Alvin A Hunter
(74) *Attorney, Agent, or Firm* — Birch, Stewart, Kolasch & Birch, LLP

(57) ABSTRACT

A method for manufacturing a golf club head comprises: fixing an internal weight member to a sole of a first member from the outside through an opening; and fixing a second member to the first member to close the opening. The first member is provided, at a position accessible from the outside of the first member, with a pedestal portion protruding toward the crown. The first member comprises a thin-walled portion between the pedestal portion and the face. The pedestal portion comprises: a first part for positioning the internal weight member in the up-down direction, and a second part for positioning the internal weight member in the toe-heel direction and/or front-back direction of the head. The internal weight member positioned by the first and second parts, extends toward the face at a position above the thin-wall portion without contacting with the thin-wall portion and the face.

19 Claims, 13 Drawing Sheets

(56) References Cited

U.S. PATENT DOCUMENTS

| | | | | |
|---|---|---|---|---|
| 6,533,679 B1* | 3/2003 | McCabe | ............... | A63B 60/52 |
| | | | | 473/335 |
| 7,455,600 B2* | 11/2008 | Imamoto | ............... | A63B 60/02 |
| | | | | 473/345 |
| 7,651,410 B2* | 1/2010 | Shimazaki | ......... | A63B 53/0466 |
| | | | | 473/335 |
| 7,798,913 B2* | 9/2010 | Noble | ................ | A63B 53/0466 |
| | | | | 473/324 |
| 8,900,070 B1* | 12/2014 | Dawson | .............. | A63B 53/047 |
| | | | | 473/329 |
| 8,926,448 B1* | 1/2015 | Ivanova | ............ | A63B 53/0466 |
| | | | | 473/329 |
| 8,992,339 B2* | 3/2015 | Matsunaga | ........ | A63B 53/0466 |
| | | | | 473/335 |
| 9,211,451 B1* | 12/2015 | Westrum | ................ | A63B 60/00 |
| 9,616,301 B2* | 4/2017 | Clausen | ................ | A63B 60/00 |
| 9,802,084 B2* | 10/2017 | Shimahara | ............. | A63B 53/04 |

FOREIGN PATENT DOCUMENTS

| | | | | | |
|---|---|---|---|---|---|
| JP | 10094623 A | * | 4/1998 | ........... | A63B 53/047 |
| JP | 2001204856 A | * | 7/2001 | | |
| JP | 2004024735 A | * | 1/2004 | | |
| JP | 2004024736 A | * | 1/2004 | | |
| JP | 2015062667 A | * | 4/2015 | ............ | A63B 60/00 |
| JP | 2015119834 A | * | 7/2015 | | |
| JP | 2016154811 A | * | 9/2016 | ............ | A63B 60/02 |
| JP | 2016159142 A | * | 9/2016 | | |
| WO | WO 2013/158146 A1 | | 10/2013 | | |

* cited by examiner

GOLF CLUB HEAD AND MANUFACTURING METHOD THEREOF

TECHNICAL FIELD

The present invention relates to a golf club head and a manufacturing method thereof.

BACKGROUND ART

In the case of golf club heads having an internal hollow portion, especially golf club heads such as fairway woods and so-called hybrids often used to hit a ball placed directly on the ground, it is preferable to make the height of the sweet spot of the clubface lower in order to obtain a long flight distance of the ball.

Patent Document 1 below describes a fairway wood type golf club head, which comprises a metallic main body and a metallic face component, the metallic main body comprises a crown, a sole, a hosel, a cavity, an opening, and a lip-shaped protrusion as an internal weight, and the metallic face component comprises a striking face and a return portion.

Patent Document 1: Japanese Patent No. 5952555

SUMMARY OF THE INVENTION

Problems to be Solved by the Invention

In the golf club head of Patent Document 1, in order to obtain the lip-shaped protrusion, the metallic main body and the metallic face component which have unique shapes have to be combined. Therefore, there was a problem such that the degree of freedom in designing the shapes and the like of the golf club head and the protrusion (internal weight) was low.

In view of the above problem, the present invention was made, and a primarily objective of the present invention is to provide a golf club head, in which both the lowering of the sweet spot height and a high degree of design freedom can be archived, and a method for manufacturing the same.

According to one aspect of the present invention, a golf club head having a crown, a face and a sole, comprises:
a head main body having a hollow portion therein, and
an internal weight member disposed in the hollow portion, wherein
the sole is provided with a pedestal portion disposed on the inner surface side of the sole facing the hollow portion, and protruding toward the crown, and comprises a thin-wall portion extending between the pedestal portion and the face, having a thickness smaller than the pedestal portion, and
the internal weight member is fixed to the pedestal portion, and extends toward the face at a position above the thin-walled portion without contacting with the thin-walled portion and the face,
wherein
the head main body is formed from a first member provided with at least the pedestal portion, and a second member by fixing the second member to the first member, and the pedestal portion is located at a position accessible from the outside of the first member in a state of the second member before fixed to the first member.

The pedestal portion may comprise
a first positioning part for positioning the internal weight member in the up-down direction of the head, and
a second positioning part for positioning the internal weight member in the front-back direction of the head and/or the toe-heel direction of the head.

According to another aspect of the present invention, a method for manufacturing a golf club head, which is for the golf club head composed of: a head main body comprising a crown, a face and a sole and having a hollow portion therein; and an internal weight member disposed in the hollow portion, comprises:
a preparing step of preparing a first member including at least a part of the sole, a second member to be fixed to the first member, and the internal weight member;
a first fixing step of fixing the internal weight member to the above-said at least a part of the sole on the inner surface side thereof facing the hollow portion; and
a second fixing step of fixing the second member to the first member to which the internal weight member has been fixed, wherein
the first member is provided, on the above-said inner surface side, with a pedestal portion protruding toward the crown, and comprises a thin-walled portion extending between the pedestal portion and the face, having a smaller thickness than the pedestal portion,
the pedestal portion is formed at a position accessible from the outside of the first member,
the pedestal portion comprises
a first positioning part for positioning the internal weight member in the up-down direction of the head, and
a second positioning part for positioning the internal weight member in the toe-heel direction and/or front-back direction of the head,
wherein
the first fixing step includes a positioning step of positioning the internal weight member in relation to the pedestal portion by the use of the first positioning part and the second positioning part so that the internal weight member extends toward the face at a position above the thin-wall portion without contacting with the thin-wall portion and the face; and
a internal weight member fixing step of fixing the positioned internal weight member to the pedestal portion.

The second positioning part may be configured to perform positioning of the internal weight member in both the front-back direction and toe-heel direction of the head.

The second positioning part may be a protrusion extending toward the crown, and the internal weight member may be provided with a through hole receiving the protrusion.

The amount of protruding of the protrusion may be smaller than the depth of the through hole.

An annular gap having a v-shaped cross section may be formed around the protrusion after the positioning step and before the internal weight member fixing step.

The internal weight member fixing step may include forming a welding bead between the second positioning part and the internal weight member to fix the internal weight member.

The second positioning part may include a main second positioning part on which the welding bead is not formed, and a sub second positioning part on which the welding bead is formed, wherein a gap between the sub second positioning part and the internal weight member is larger than a gap between the main second positioning part and the internal weight member.

The thickness of the thin-wall portion may be set in a range from 0.9 to 1.5 mm.

The internal weight member may have a specific gravity larger than that of the head main body.

The dimension in the toe-heel direction of the internal weight member may be larger than the dimension in the front-back direction of the internal weight member.

The internal weight member may comprise a downward protruding part extending toward the sole and positioned on the face side of the pedestal portion.

The first member may include the above-said face which is provided with an opening.

The first member may include the above-said crown which is provided with an opening.

Therefore, according to the present invention, the pedestal portion can be accessed from the outside of the first member without being obstructed by the second member, and the internal weight member can be easily fixed to the pedestal portion. This makes it possible to adopt various shapes for the internal weight member. Further, various shapes may be adopted for the first member as long as the pedestal portion is provided at a position accessible from the outside of the first member. As a result, the golf club head and the method for manufacturing the same according to the present invention, can increase the degree of freedom in designing the head having a low sweet spot height.

Further, according to the present invention, the internal weight member is positioned and fixed to the sole on the inner surface side of the sole at a position near the face. Therefore, in the golf club head according to the present invention, the position of the center of gravity of the head is lowered and made shallow from the face, and the position of the sweet spot of the face becomes low. The method according to the present invention can manufacture such golf club head with high productivity. Further, since the internal weight member does not contact with the face and the thin-wall portion, the internal weight member does not hinder the bending of the face and the thin-wall portion at the time of hitting the ball, therefore, the rebound performance of the golf club head is not deteriorated, rather improved.

Furthermore, according to the present invention, the internal weight member can be easily fixed to the pedestal portion of the first member before the first member and the second member are fixed to each other. This makes it possible to adopt various shapes for the internal weight member. Further, this makes it possible to adopt various shapes for the first member as long as the first member is provided with the pedestal portion at a position accessible from the outside of the first member. Thus, the present invention can provide a high degree of freedom in designing a golf club head.

DESCRIPTION OF THE PREFERRED EMBODIMENTS

Figure 1:
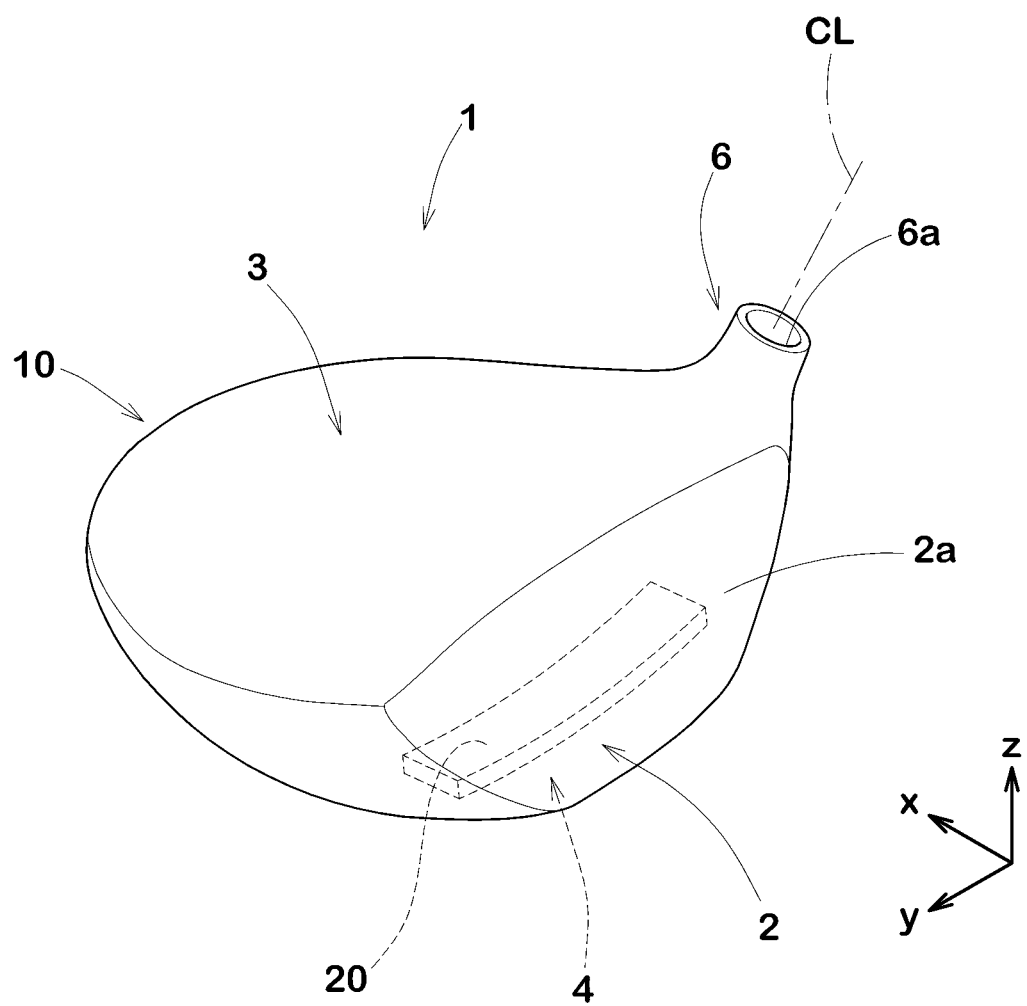
FIG. 1 is a perspective view of a golf club head as an embodiment of the present invention.

Embodiments of the present invention will now be described in detail in conjunction with accompanying drawings. Throughout all the embodiments and examples, common components, portions, parts and the like are denoted by the same reference numerals to omit redundant descriptions.

Figure 2:
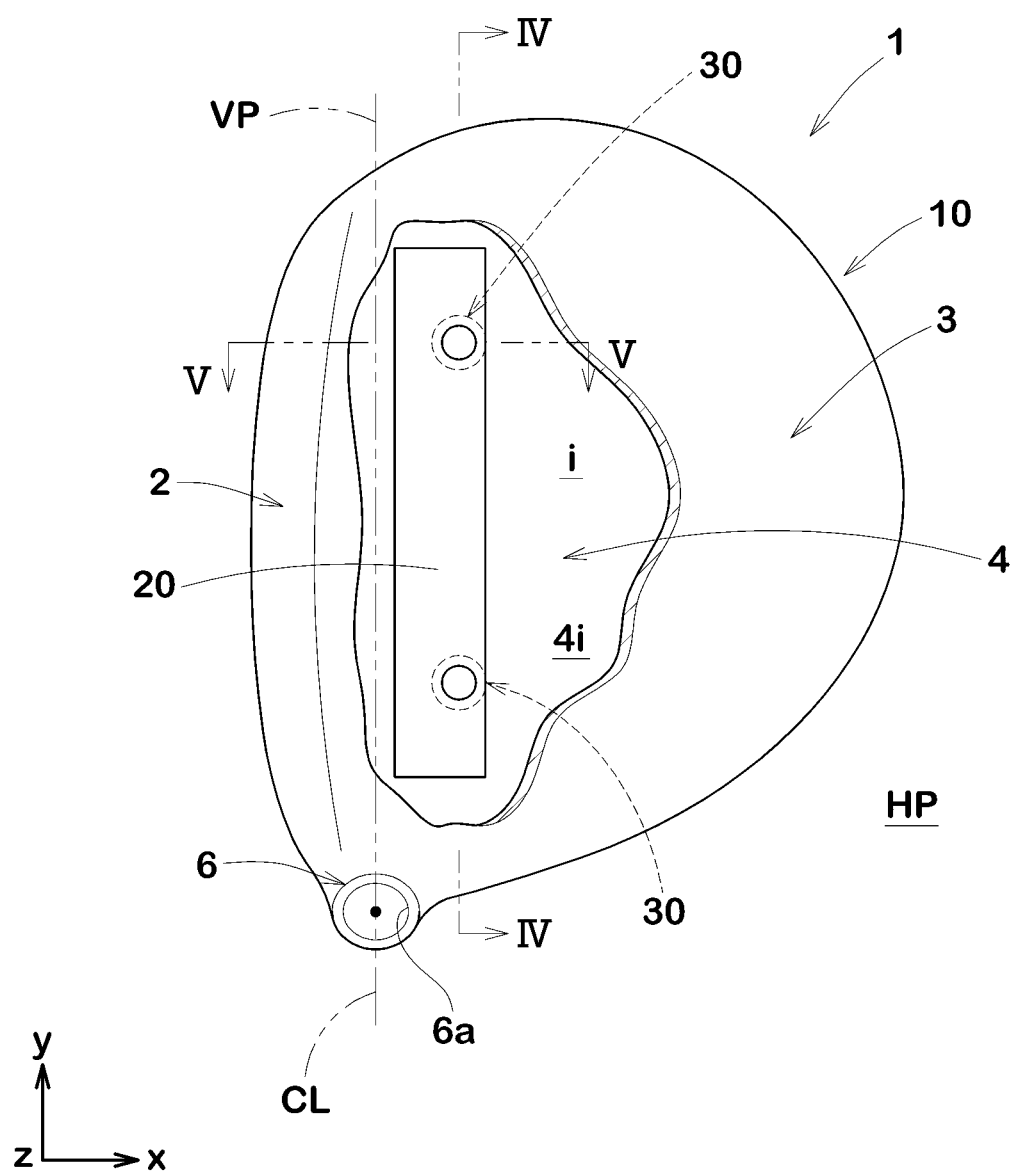
FIG. 2 is a top view of the golf club head.
Figure 3:
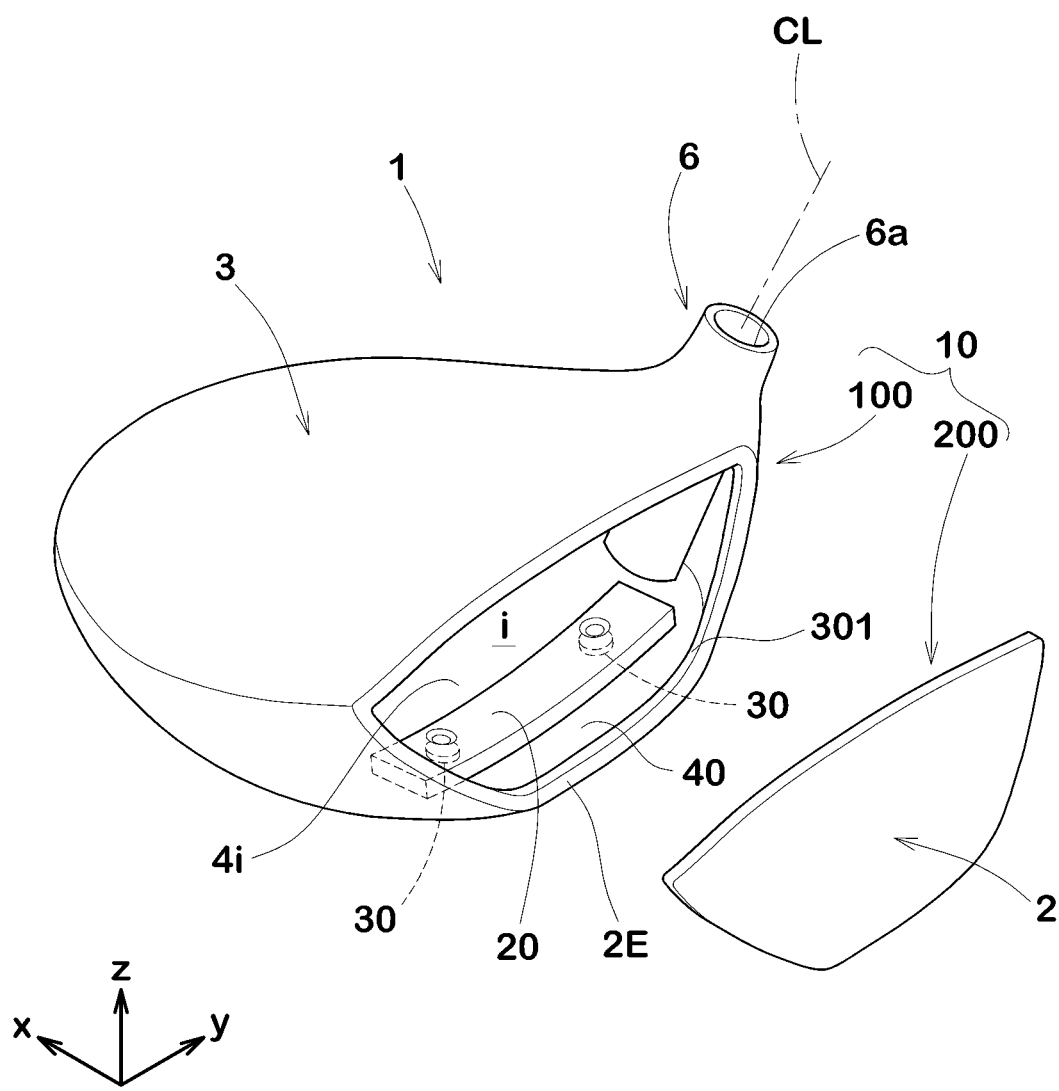
FIG. 3 is an exploded perspective view of the golf club head.

FIGS. 1 to 3 are a perspective view, a plan view and an exploded perspective view, respectively, of a golf club head 1 as an embodiment of present invention. In FIGS. 1 to 3, the head 1 is in its standard state.

Here, the standard state of the club head is such that the club head is set on a horizontal plane HP so that the axis of the club shaft (not shown) is inclined at the specified lie angle while keeping the axis on a vertical plane VP, and the clubface forms the specified loft angle with respect to the horizontal plane HP. Incidentally, in the case of the club head alone, the center line CL of the shaft inserting hole 6a of the head can be used instead of the axis of the club shaft.

In this application including the description and claims, dimensions, positions, directions and the like relating to the club head refer to those under the standard state of the club head unless otherwise noted.

Based on the standard state, a front-back direction x of the head, a toe-heel direction y of the head, and an up-down direction z of the head are defined as follows. The front-back direction x is a direction orthogonal to the vertical plane VP and parallel to the horizontal plane HP. The toe-heel direction y is a direction parallel to both the vertical plane VP and the horizontal plane HP. The up-down direction z is a direction orthogonal to both the front-back direction x head and the toe-heel direction y. Incidentally, in the front-back direction x of the head, the face 2 is positioned in the front of the head.

According to the present invention, the club head 1 is provided with a hollow portion (i) therein. The hollow portion (i) is a substantially closed space.

The club head 1 in the present embodiment is designed as a club head suitable for a golf club hitting a ball placed directly on the ground. Examples of such golf club include a fairway wood and a hybrid. These golf clubs typically have loft angles of from 13 to 35 degrees, head volumes of from about 100 cc to about 200 cc, and head weight of from about 190 g to about 240 g, but are not limited thereto.

Examples of the fairway wood include spoon (#3), buffy (#4), creek (#5), and other woods (#7, #9). The hybrid is well known in the art as having a club head whose shape is intermediate between a wood club head and an iron club head.

The golf club head 1 comprises a face 2, a crown 3, a sole 4, and the like arranged to enclose the hollow portion (i).

The golf club head 1 is composed of a head main body 10 having an open space which forms the hollow portion (i), and an internal weight member 20 disposed in the hollow portion (i). The head main body 10 includes the face 2, the crown 3, the sole 4c and the like.

Incidentally, the hollow portion (i) may be void or filled with a gel for adjusting the head weight, for example.

In the present embodiment, the face 2, the crown 3 and the sole 4 are made of metal materials. For example, stainless steel, maraging steel, titanium alloy, magnesium alloy and aluminum alloy may be suitably used.

Further, non-metal materials such as fiber reinforced resins may be used as a part of the head 1, for example, the crown 3.

The face 2 is positioned on the front of the head 1 for striking a golf ball.

The outer surface (front surface) of the face 2 forms a clubface, namely, ball-striking surface directly contacting the ball. Although not shown, the ball-striking surface may be provided with a plurality of clubface grooves extending in parallel with the toe-heel direction of the head.

The inner surface (back surface) of the face 2 faces the hollow portion (i).

The crown 3 extends from the upper edge of the face 2 toward the back side of the head, and the outer surface thereof forms the upper surface of the head. The inner surface of the crown 3 faces the hollow portion (i).

The hosel 6 is provided on the heel side of the crown 3. The hosel 6 has a shaft insertion hole 6a into which a club shaft (not shown) is fixed.

The sole 4 extends from the lower edge of the face 2 toward the back side of the head, and the outer surface thereof forms the bottom surface of the head. The inner surface 4i of the sole 4 faces the hollow portion (i).

As shown in FIG. 3, the sole 4 is provided with a pedestal portion 30 disposed on the inner surface 4i for fixing the internal weight member 20, and the sole 4 comprises a thin-wall portion 40.

Figure 4:
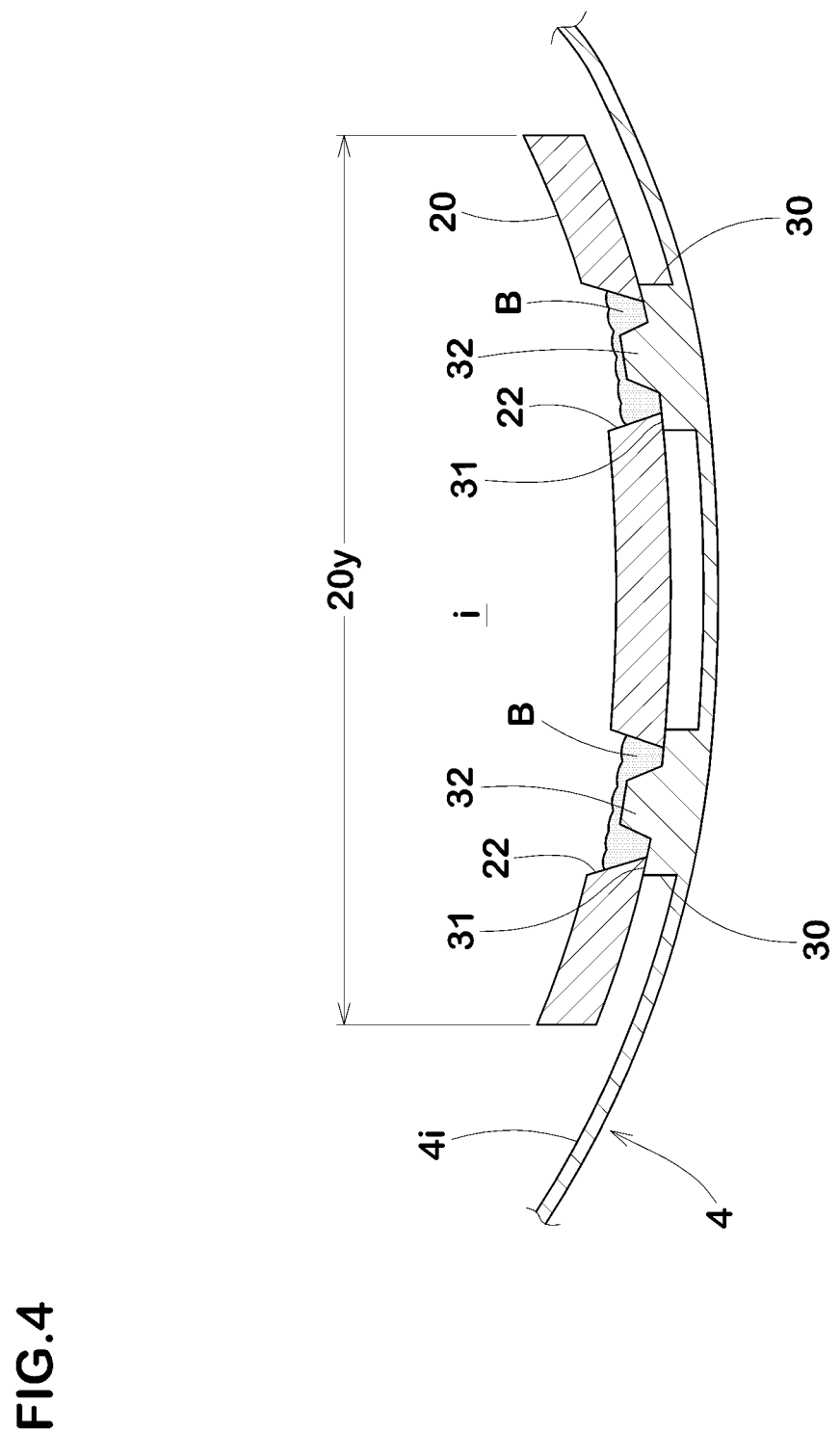
FIG. 4 is a cross-sectional view taken along line Iv-iv of FIG. 2.
Figure 5:
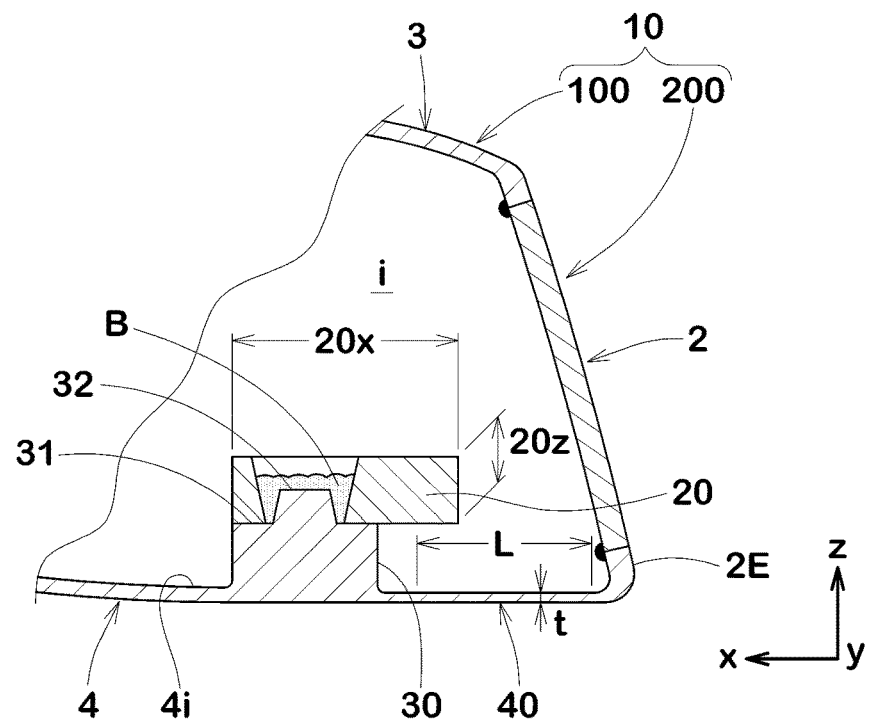
FIG. 5 is a cross-sectional view taken along line v-v of FIG. 2.

FIGS. 4 and 5 show cross sections taken along line Iv-iv and line v-v of FIG. 2, respectively.

As shown in FIGS. 4 and 5, the pedestal portion 30 protrudes toward the crown 3 (or upward) from the inner surface 4i.

In the present embodiment, the pedestal portion 30 is formed at each of a toe side-position and a heel-side position on the inner surface 4i, namely, two pedestal portions 30 are formed.

The number of the pedestal portions 30 can be arbitrarily determined. For example, three or more pedestal portions 30 may be provided. Further, a single pedestal portion 30 may be provided. In the case of the single pedestal portion 30, it is preferable that the pedestal portion 30 extends continuously in the toe-heel direction of the head by a certain length.

In the present embodiment, the pedestal portions 30 are integrally formed with the sole 4. It is also possible to form the pedestal portion(s) 30 separately from the sole 4 and then fix to the sole 4.

The thickness of the thin-wall portion 40 is smaller than that of the pedestal portion(s) 30.

The thin-wall portion 40 extends between the pedestal portion(s) 30 and the face 2.

It is preferable that, on the face 2 side of the pedestal portion(s) 30, the thin-wall portion 40 forms a wide area extending in the toe-heel direction of the head.

Since the thickness of the thin-wall portion 40 is smaller than that of the pedestal portion 30, the thin-wall portion 40 is easily bent when the face is hit by the ball, which helps to improve the rebound performance of the head 1.

It is not essential but preferable for improving the rebound performance without impairing the durability of the head, that the thickness t of the thin-wall portion 40 is, for example, set to be not more than 2.0 mm, more preferably not more than 1.8 mm, still more preferably not more than 1.6 mm, but not less than 0.9 mm.

It is not essential but preferable that the dimension L in the front-back direction, of the thin-wall portion 40 is, for example, not less than 5.0 mm, more preferably not less than 10.0 mm. As a result, when the face is hit by the ball, a part of the sole 4 between the pedestal portion(s) 30 and the face 2 can be largely bent, which helps to improve the rebound performance of the head 1.

The internal weight member 20 is for shifting the center of gravity of the head 1 to a position which is low from the sole and shallow from the face.

The internal weight member 20 in this example is made of a metal material. The internal weight member 20 may be made of the same metal material as the pedestal portion(s) 30.

Further, the internal weight member 20 may be made of a material having a specific gravity larger than the pedestal portions 30, namely, the sole 4 in the present embodiment (for example, an alloyed metal containing a high specific gravity metal such as tungsten). This is preferable in that the position of the center of gravity of the head 1 can be made further shallow and low.

The internal weight member 20 is fixed to the pedestal portion(s) 30. In the present embodiment, the internal weight member 20 is fixed to the pedestal portions 30 by welding. But, other fixing means may be used.

In the present embodiment, the dimension 20y in the toe-heel direction y of the internal weight member 20 is larger than the dimension 20x in the front-back direction x of the internal weight member 20. The internal weight member 20 has a flat shape such that the dimension 20z in the up-down direction z of the internal weight member 20 is smaller than the dimension 20x in the front-back direction. However, the internal weight member 20 is not limited to such a flat shape.

The internal weight member 20 extends toward the face 2 at a position above the thin-wall portion 40, without contacting with the thin-wall portion 40 and the face 2.

The internal weight member 20 is disposed, keeping a sufficient distance from the face 2 so as not to contact with the face 2 when the face 2 is hit by the ball.

Also in the reference state of the head 1, the internal weight member 20 does not contact with the face 2.

The internal weight member 20 is disposed near the inner surface 4i and the face 2, therefore, the center of gravity of the head can be made low and shallow.

As a result, the head 1 having a low sweet spot height is provided. Therefore, when the head 1 hits a ball directly placed on the ground, as the hitting positions becomes close to the position of the sweet spot. The rebound performance of the head is improved and the hit ball is provided with a low spin. Thus, the flight distance of the ball can be increased.

Further, the internal weight member 20 is arranged so as not to contact with the face 2 and the thin-wall portion 40, therefore, when the ball hits the face, the internal weight member 20 does not hinder the bending of the face 2 and the thin-wall portion 40. Therefore, the internal weight member 20 does not deteriorate the rebound performance of the head 1.

In a space between the internal weight member 20 and the thin-wall portion 40, a flexible or soft material (for example, gel, impact absorbing material, impact sound absorbing material and the like) may be disposed as long as it does not hinder the bending of the thin-wall portion 40.

The head main body 10 is composed of a first member 100 and a second member 200 fixed to each other.

The first member 100 is the remaining part of the head main body 10 excepting the second member 200, and includes the pedestal portion 30.

In the present embodiment, the second member 200 is a face plate which forms a part of the face 2 including the ball striking face, and the face plate is subsequently flat or slightly curved.

Therefore, the first member 100 includes the crown 3, the sole 4, the hosel 6, and a peripheral portion 2E of the face 2 around an opening 301 to which the face plate is fitted.

Thus, the head main body 10 in this embodiment is of a so-called face open type.

The pedestal portion(s) 30 is/are formed at position(s) accessible from the outside of the first member 100 before the second member 200 is fixed to the first member 100.

In this embodiment, such position(s) can be accessed through the opening 301 as shown in FIG. 3.

In this application, the expression "accessible" means that an operator can visually recognize the pedestal portion(s) 30 and can fix the internal weight member 20 to the pedestal portion(s) 30.

Therefore, in the head 1 according to the present embodiment, at the time before the second member 200 is fixed to the first member 100 and the opening 301 is closed by the second member 200, the internal weight member 20 can pass through the opening 301 and it can be easily fixed to the pedestal portion(s) 30 through the opening 301. This makes it possible to adopt various shapes for the internal weight member 20, in particular, a shape which forms an undercut (space) between the internal weight member 20 and the thin-wall portion 40. Further, various shapes can be adopted for the first member 100 as long as the pedestal portion(s) 30 is/are provided at position(s) accessible from the outside of the first member 100. Thus, the head 1 according to the present embodiment may have a high degree of design freedom.

Next, an embodiment of the manufacturing method of the head 1 according to the present invention will be described.

The manufacturing method according to this embodiment comprises at least a preparation step, a first fixing step, and a second fixing step.

The preparation step is for preparing the first member 100 including at least a part of the sole 4, the second member 200 to be fixed to the first member 100, and the internal weight member 20.

In the preparation step, the first member 100, which integrally includes the crown 3, the sole 4, the hosel 6, and the face peripheral portion 2E around the opening 301 as shown in FIG. 3, is prepared, wherein the inner surface 4i of the sole 4 is provided with the pedestal portion(s) 30 at position(s) accessible from the outside of the first member 100, and the sole 4 is provided with the thin-wall portion 40.

In the first member 100 in this embodiment, the pedestal portions 30 can be accessed through the front opening 301.

Therefore, the operator can access the pedestal portion(s) 30 through the opening 301 and can perform works of mounting the internal weight member 20 on the pedestal portion(s) 30 and fixing it thereto.

On the other hand, depending on the size and the like of the opening 301, there is a possibility that the above-mentioned works are subject to certain restrictions. Thus, it is desirable that the internal weight member 20 can be easily positioned with respect to the pedestal portion(s) 30 even under such a restricted situation.

Figure 6:
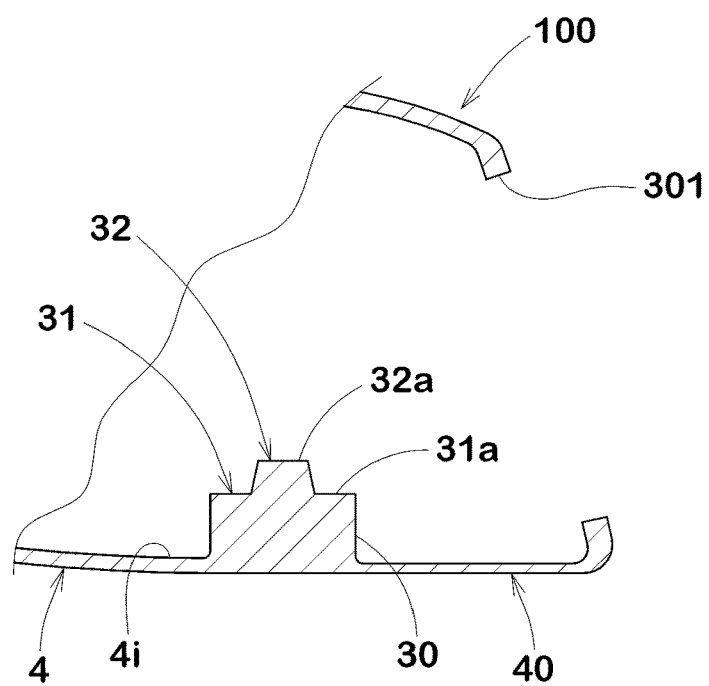
FIG. 6 is a cross-sectional view taken along line v-v of FIG. 2 before fixing the internal weight member.

FIG. 6 shows the pedestal portion 30 on which the internal weight member 20 is not yet mounted.

Figure 7:
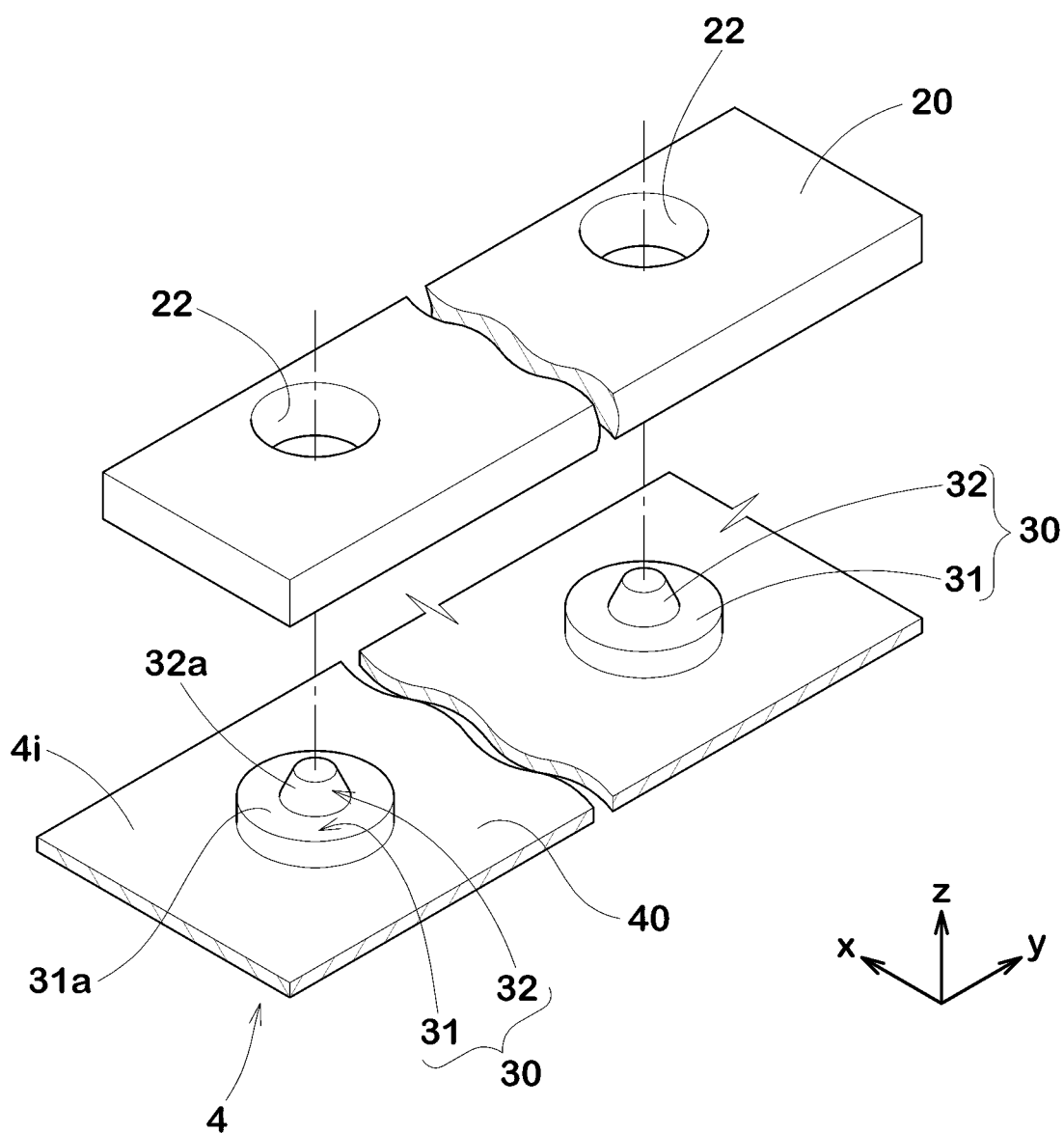
FIG. 7 is an exploded perspective view showing the pedestal portion and the internal weight member.

FIG. 7 shows an exploded perspective view of the internal weight member 20 and the pedestal portion 30.

As shown in FIGS. 6 and 7, in the present embodiment, each pedestal portion 30 is provided with
a first positioning part 31 for positioning the internal weight member 20 in the up-down direction of the head, and
a second positioning part 32 for positioning the internal weight member 20 in the toe-heel direction of the head and/or the front-back direction of the head.

The first positioning part 31 is formed by the upper surface 31a of the pedestal portion 30 which is located above the inner surface 4i of the sole 4, for example.

And the upper surface 31a contacts with the lower surface of the internal weight member 20, to position the internal weight member 20 in the up-down direction of the head (to limit its lowest position).

It is preferable to configure the second positioning part 32 so as to position the internal weight member 20 in the front-back direction as well as the toe-heel direction of the head. Such second positioning part 32 in this example is formed as a protrusion 32a protruding toward the crown 3 from the first positioning part 31 (or the upper surface 31a) of the pedestal portion 30.

The internal weight member 20 is prepared in such a size that it can be placed inside the first member 100 through the opening 301.

Further, as shown in FIG. 7, the internal weight member 20 of the present embodiment is provided with through holes 22 extending in the up-down direction z of the head in order to receive or engage with the protrusions 32a formed in the pedestal portions 30 as the second positioning parts 32.

The second member 200 in the present embodiment is prepared as a plate (face plate) as shown in FIG. 3 which can fit into the opening 301 of the first member 100.

The first fixing step is for fixing the internal weight member 20 to the first member 100 on the inner surface 4i side of the sole 4.

In the present embodiment, the first fixing step includes:
a positioning step of positioning the internal weight member 20 at a position predetermined relatively to the pedestal portion(s) 30 by the use of the first positioning part 31 and the second positioning part 32 of the pedestal portion(s) 30.

In the positioning step, the internal weight member 20 is inserted in the hollow portion (i) of the first member 100 through the opening 301, and positioned above the pedestal portions 30 as shown in FIG. 7.

Then, the internal weight member 20 is mounted or sat on the pedestal portions 30 so that the protrusions 32a (second positioning parts 32) of the pedestal portions 30 are inserted into the respective through holes 22 of the internal weight member 20.

As a result, the lower surface of the internal weight member 20 contacts with the upper surfaces 31a (first positioning parts 31) of the pedestal portions 30, therefore, the internal weight member 20 is positioned in the up-down direction z of the head.

Further, movements in the horizontal direction, of the through holes 22 of the internal weight member 20 can be restricted by the protrusions 32a (second positioning parts 32) inserted therein, and the internal weight member 20 is positioned in both the front-back direction and the toe-heel direction of the head.

Figure 8:
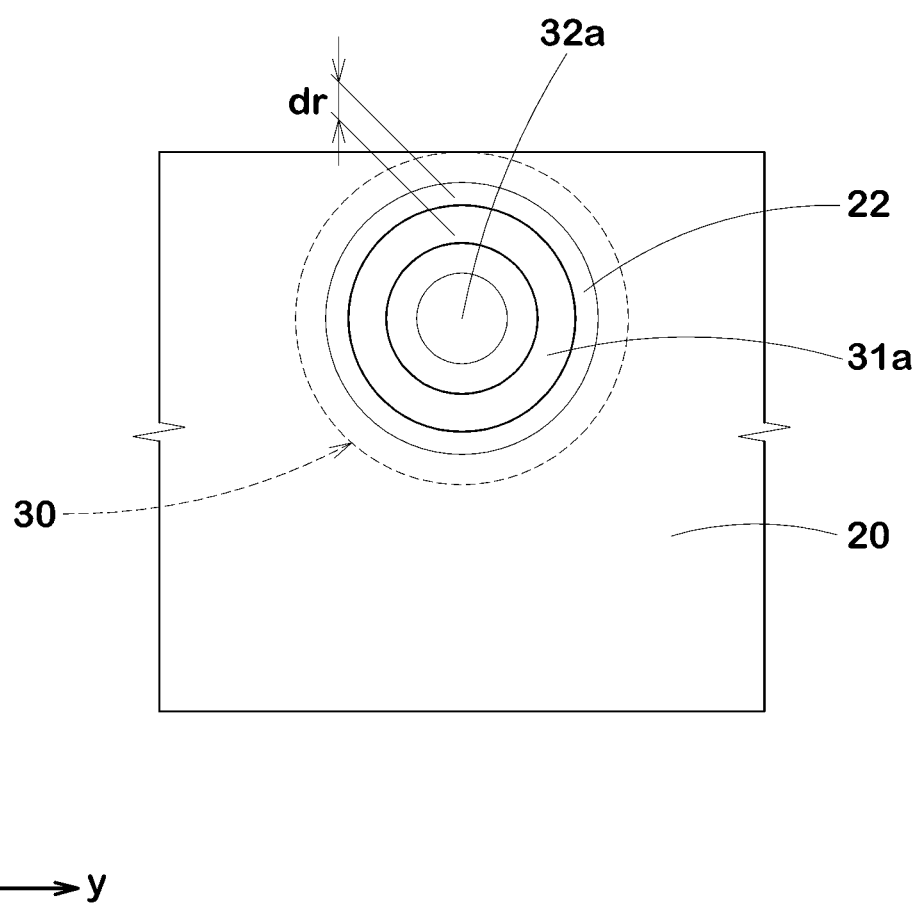
FIG. 8 is a partial top view showing a state in which the internal weight member is positioned at the pedestal portion.

FIG. 8 is a top view of a part of the internal weight member 20 positioned at the pedestal portion 30 and shows the through hole 22 and the protrusion 32a inserted therein.

As shown, in this embodiment, the radius of the through hole 22 is larger than the radius of the protrusion 32a to have a difference dr.

Accordingly, the position of the internal weight member 20 has a margin of dr×2 in relation to the pedestal portion 30.

In this specification, therefore, the "positioning" means not only that the two components are positioned so that they cannot move relatively to each other, but also that the two components are positioned so that they can move relatively to each other within a limited narrow range. The latter can be preferably adopted when manufacturing errors of the components are taken into account, in particular.

Figure 9:
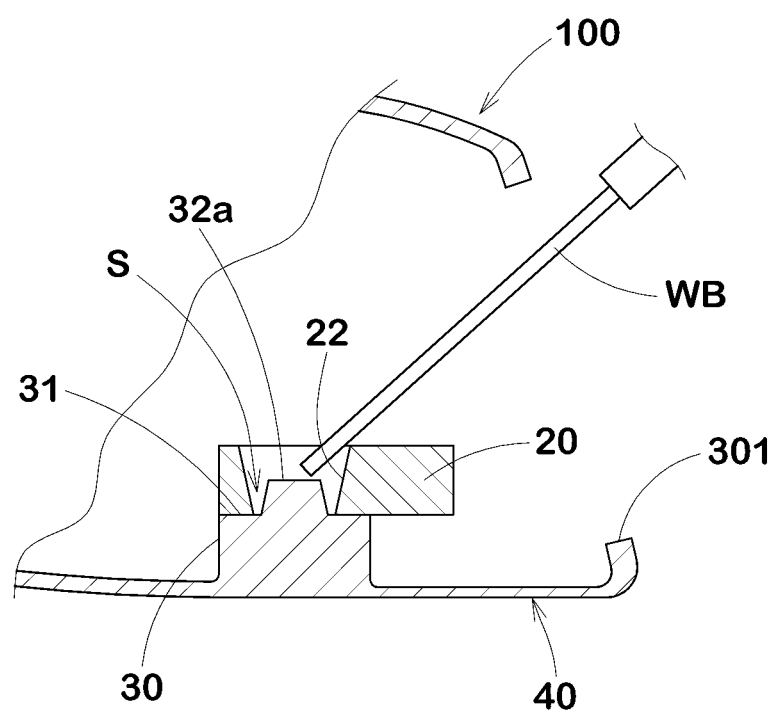
FIG. 9 is a cross-sectional view of the first member and the internal weight member for explaining the first fixing step.

Through the positioning step, as shown in FIG. 9, the internal weight member 20 is positioned so as to extend from the pedestal portion 30 toward the face 2 at a position above the thin-wall portion 40, without coming into contact with the thin-wall portion 40 and the face 2.

The next internal weight member fixing step is for fixing the positioned internal weight member 20 to the pedestal portion(s) 30. The fixation of the two components 20 and 30 is performed through the opening 301 from the outside. For the fixation, various methods or techniques, e.g. welding, caulking, adhesion, and various fastener components such as screws, may be employed.

In the present embodiment, in order to fix the internal weight member 20, a weld bead is utilized.

The weld bead is formed between the second positioning part 32 and the internal weight member 20 in order to obtain high bonding strength.

Specifically, a welding rod WB is supplied to or a laser beam is irradiated to a position between the second positioning part 32 and the through hole 22 of the internal weight member 20, through the opening 301 as shown in FIG. 9.

Thereby, as shown in FIG. 5, the weld bead B is formed to extend between the second positioning part 32 and the through hole 22 of the internal weight member 20.

The weld bead B fuses with both of the internal weight member 20 and the pedestal portion 30 and can unite them with one another.

As another example, it is possible that the weld bead B fuses with only the pedestal portion 30, and the weld bead B mechanically fixes (restrains) the internal weight member 20 to the pedestal portion 30 without fusing therewith.

As another example of the internal weight member fixing step, the weld bead B can be formed between the internal weight member and the first positioning part 31 so as to fuse with both of them.

In order to efficiently perform the internal weight member fixing step, it is preferred that an annular gap s or groove having a v-shaped cross section is formed around the protrusion 32a in a state after the positioning step and before the internal weight member fixing step.

Such v-shaped gap s is useful for reliably filling the molten metal between the second positioning part 32 and the through hole 22 and suppressing welding defects between them. Such gap S can be formed by increasing the inner diameter of the through hole 22 of the internal weight member 20 toward the crown 3, and/or by tapering the protrusion 32a toward the crown 3.

It is preferable that, as shown in FIG. 9, the height (amount of protruding) of the protrusion 32a (second positioning part 32) is smaller than the depth (dimension in the up-down direction) of the through hole 22. In this case, the protrusion 32a does not protrude from the through hole 22. This facilitates to filling the molten metal evenly around the protrusion 32a. If the protrusion 32a protrudes upward from the through hole 22, it becomes difficult for the operator to view the back side of the protrusion 32a from through the opening 301, and the welding rod is hard to reach the back side exactly, which may lower the welding workability.

Next to the internal weight member fixing step, the second fixing step is carried out.

The second fixing step is for fixing the second member 200 to the first member 100 to which the internal weight member 20 has been already fixed. The second fixing step is performed from the outside of the head 1.

In the present embodiment, as shown in FIG. 5, the face plate as the second member 200, is fixed to the edge of the opening 301 of the first member 100 by welding. As a result, the head 1 is manufactured.

According to the manufacturing method of the present embodiment as described above, it is possible to increase the degree of freedom in designing the shapes of the head main body 10 and the internal weight member 20.

For example, in the case of the head main body 10 of the face opening type as shown in FIG. 5, it is difficult to form a space between the internal weight member 20 and the thin-wall portion 40 if the internal weight member 20 and the first member 100 are formed as monoblock casting. However, in the manufacturing method of the present embodiment, the club head 1 having such space can be easily manufactured.

The head main body 10 is not limited to the above-described face opening type shown in FIGS. 1-3.

Figure 10:
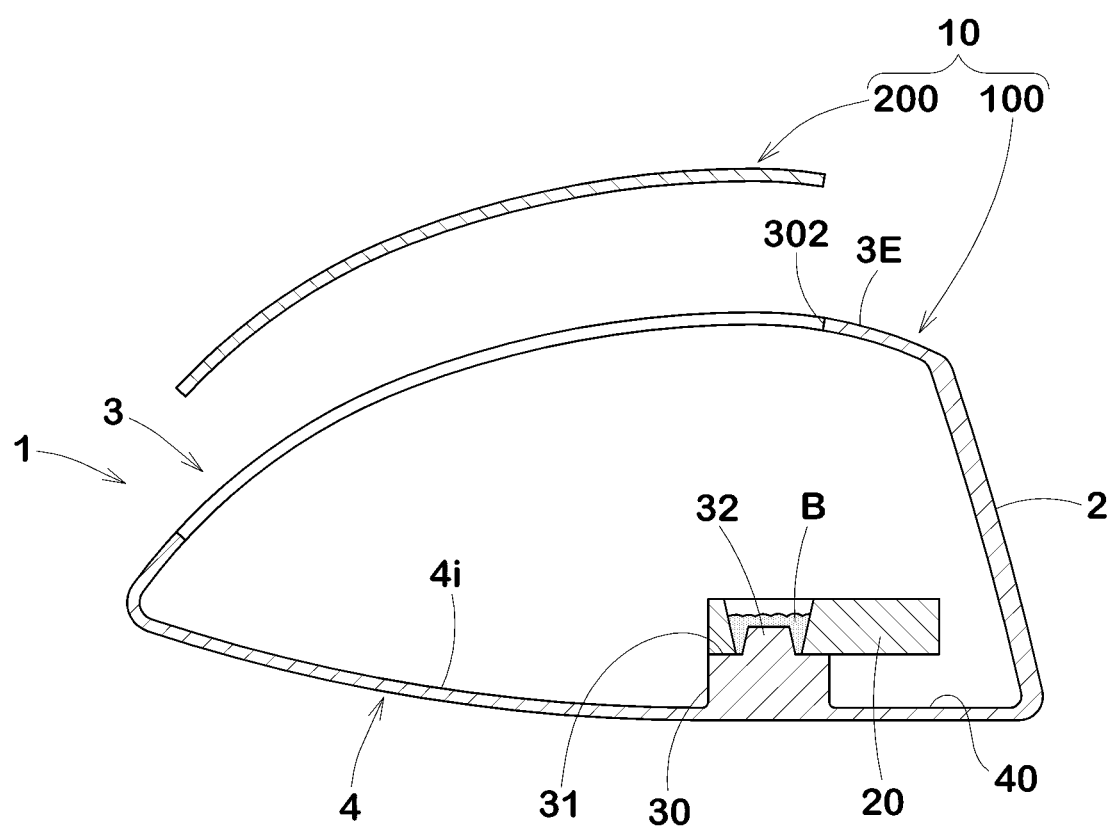
FIG. 10 is a cross-sectional view showing another example of the head main body in which an opening is formed in the crown.

The head main body 10 can be configured as a crown opening type as shown in FIG. 10.

In this embodiment, the head main body 10 as the first member 100 integrally includes, the face 2, the sole 4, the hosel 6 (not shown), and a crown peripheral portion 3E around an opening 302 which is formed within the crown 3.

The first member 100 is provided with the pedestal portion(s) 30 on the inner surface 4i of the sole 4 and the thin-wall portion 40 as described above.

The pedestal portions 30 are provided at positions accessible from the outside of the first member 100 through the opening 302 of the crown 3.

In the second fixing step, the second member 200 which is a crown plate in the present embodiment, is fixed to the first member 100 by fixing the crown plate to the edge of the opening 302, and the opening 302 is closed thereby.

In the case of the head main body 10 of the crown opening type, it is difficult to form a space between the internal weight member 20 and the thin-wall portion 40 if the internal weight member 20 and the first member 100 are formed as monoblock casting.

However, in the manufacturing method of the present embodiment, the club head 1 having such space can be easily manufactured.

Thus, it is possible to increase the degree of freedom in designing the shapes of the head main body 10 and the internal weight member 20.

The pedestal portion 30 can be modified into various shapes.

Figure 11:
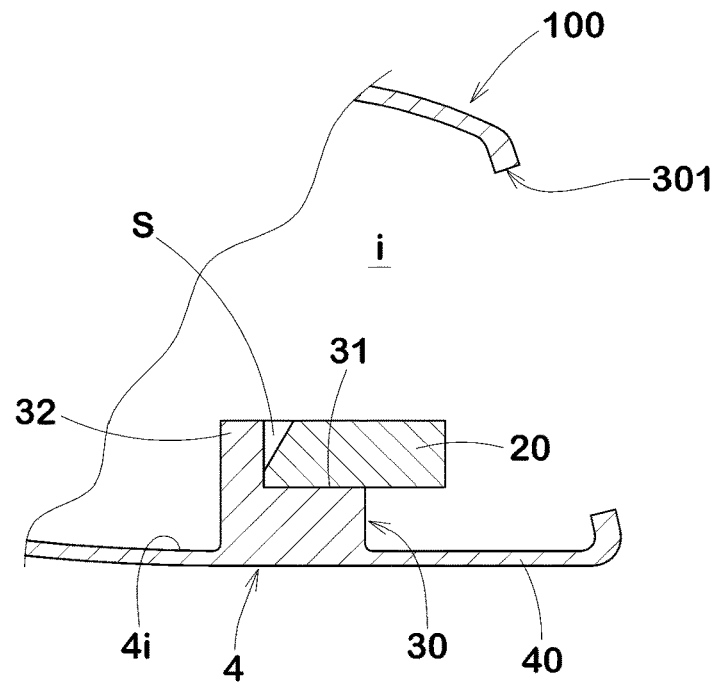
FIG. 11 and FIG. 12 are cross-sectional views showing another example of the combination of the pedestal portion and the internal weight member before fixed and after fixed, respectively.

FIG. 11 shows an example of the pedestal portion 30 which has an L-shape in a cross-sectional view taken parallel with the directions x and z.

The pedestal portion 30 is provided with the first positioning part 31 and the second positioning part 32.

The first positioning part 31 has an upper surface contacting with the lower surface of the internal weight member 20 and positions the internal weight member 20 in the up-down direction z of the head.

The second positioning part 32 has a side surface extending upward from the rear edge of the first positioning part 31. The second positioning part 32 contacts with a rear edge of the internal weight member 20, and restricts the backward motion of the internal weight member 20 to position the internal weight member 20 in the front-back direction x of the head.

It is preferable that, when the internal weight member 20 is positioned by the second positioning part 32 of the pedestal portion 30, a gap s having a v-shaped cross-sectional shape and extending in the toe-heel direction of the head is formed between the second positioning part 32 and the internal weight member 20. For that purpose, the rear edge or rear end surface of the internal weight member 20 is provided with a forward inclining part as shown in FIG. 11.

In the internal weight member 20 in this example, the above-mentioned through holes 22 may be omitted.

Figure 12:
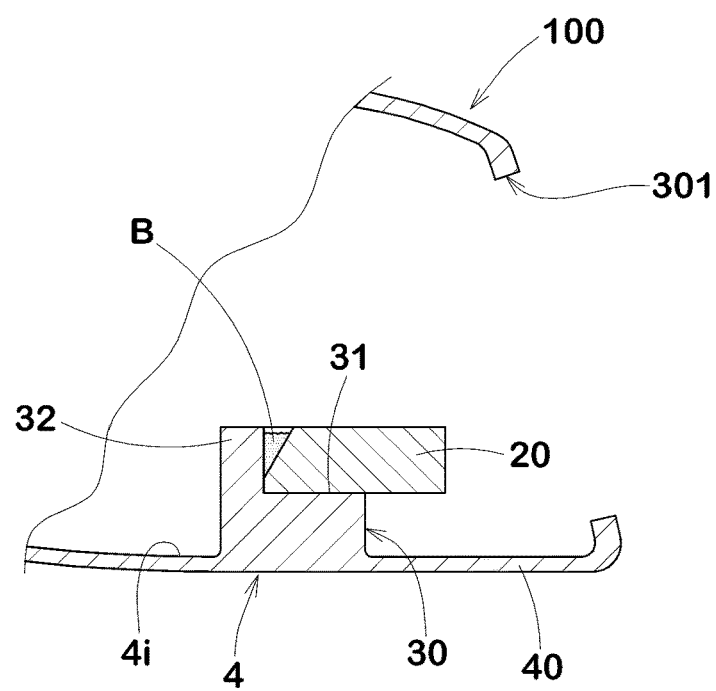

Incidentally, the gap S functions as a groove for filling the molten metal as shown in FIG. 12, and serves to form a preferable weld bead B.

Figure 13:
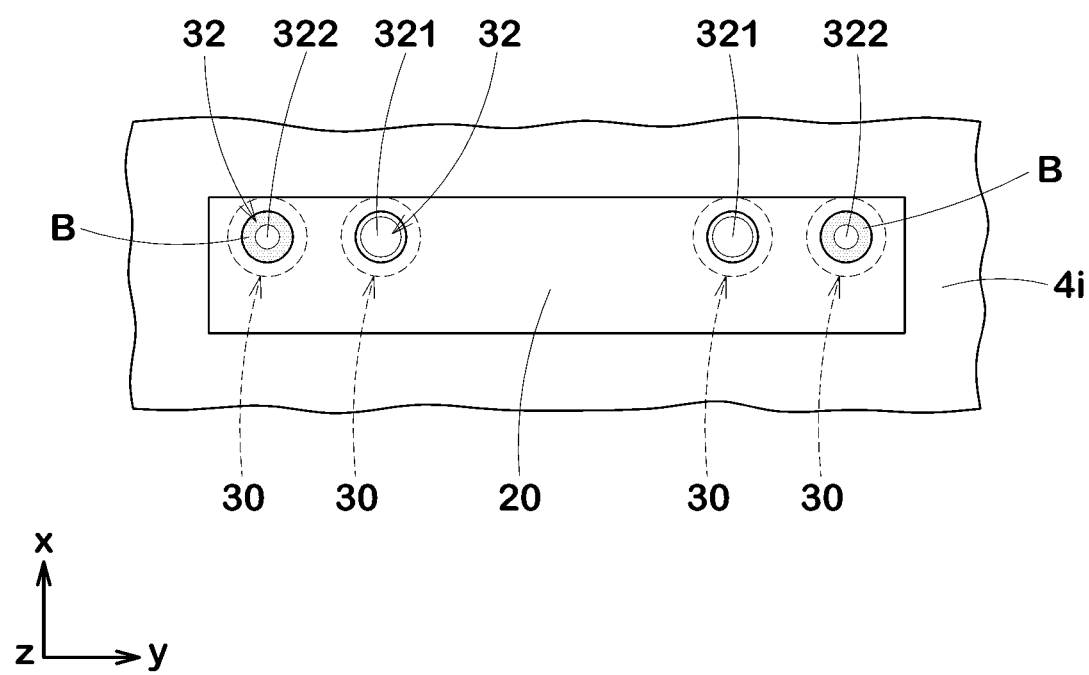
FIG. 13 is a top view showing still another example of the combination of the pedestal portion and the internal weight member.

FIG. 13 is a plan view showing a modified example of the combination of the internal weight member 20 and the pedestal portions 30 shown in FIGS. 2-10.

In this example, the second positioning parts 32 include a main second positioning part 321 in which the welding bead B for fixing the internal weight member 20 to the pedestal portion 30 is not formed, and
a sub second positioning part 322 in which the weld bead B is formed.

With respect to the above-mentioned difference dr (shown in FIG. 8) between the radius of the through hole 22 and the radius of the protrusion 32a (or second positioning part 32), the main second positioning part 321 and the sub second positioning part 322 are formed such that the difference dr of the sub second positioning part 322 is larger than that of the main second positioning part 321.

In the positioning step of the manufacturing method, the main second positioning part 321 can accurately position the internal weight member 20 with respect to the pedestal portion 30 without play.

On the other hand, the above-mentioned gap s formed by the sub second positioning part 322 becomes relatively large.

In the internal weight member fixing step, the molten metal is poured into only the gap s around the sub second positioning part 322.

Therefore, owing to the sufficient molten metal around the sub second positioning part 322, a strong weld joint strength can be obtained, and at the same time, by the main second positioning part 321, the accurate positioning of the internal weight member 20 can be achieved.

It is preferable that at least two main second positioning parts 321 are provided. It is preferable that at least two sub second positioning parts 322 are provided.

Figure 14:
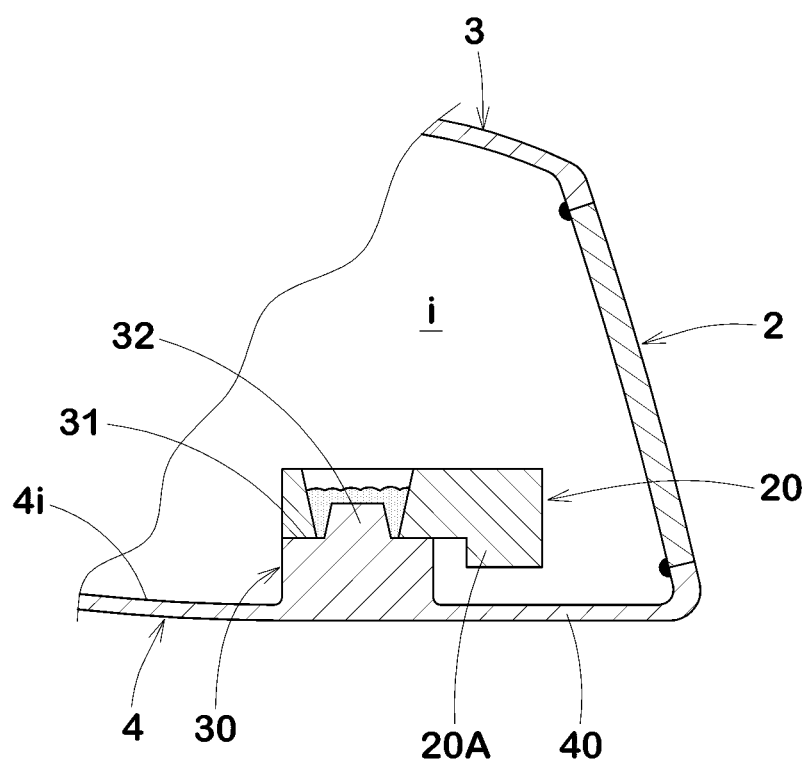
FIG. 14 is a cross-sectional view showing another example of the internal weight member which is provided with a downward protruding part.

FIG. 14 shows a modification of the internal weight member 20 shown in FIGS. 1-10, wherein the internal weight member 20 is provided with a downward protruding part 20A located on the face side of the pedestal portion(s) 30 and extending toward the sole 4.

The downward protruding part 20A extends downward beyond the first positioning part 31 of the pedestal portion 30.

Since such internal weight member 20 can distribute more weight to the lower position of the head 1 on the face 2 side, it is possible to make the position of the center of gravity of the head 1 shallower and lower.

Figure 15:
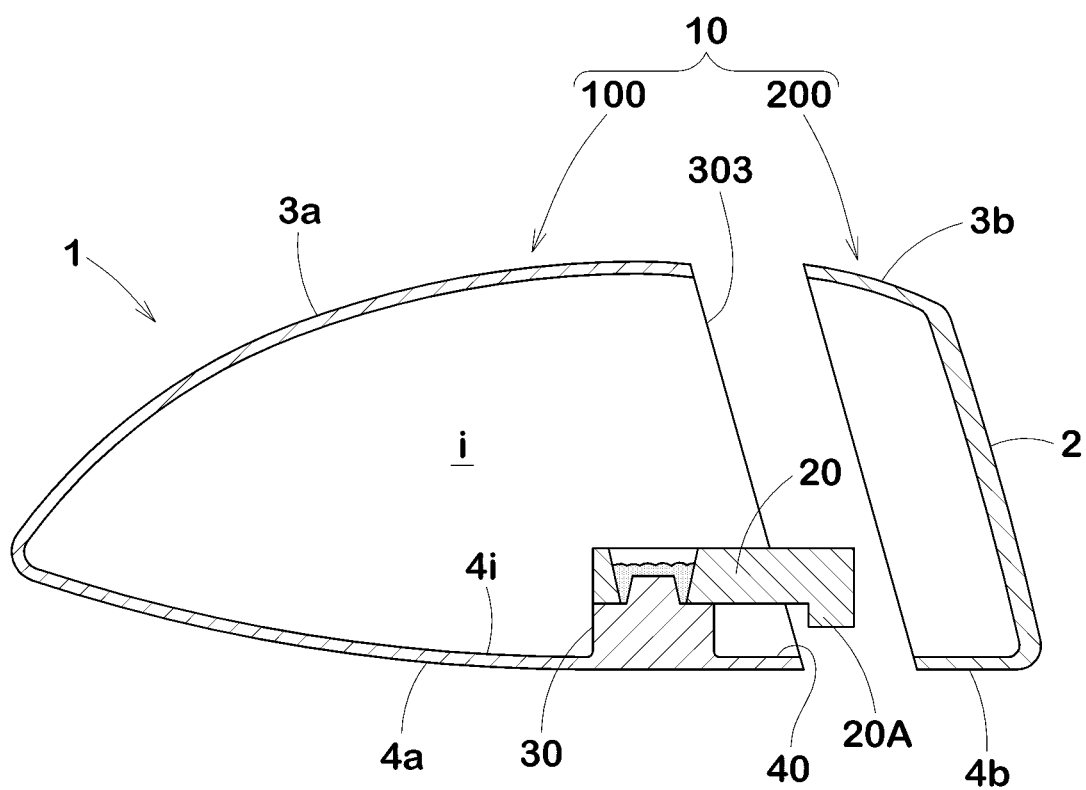
FIG. 15 is a cross-sectional view showing another example of the head main body together with the internal weight member provided with a downward protruding part.

FIG. 15 shows another example of the head main body 10 so called cup face type.

The head main body 10 in this example comprises a head rear part as the first member 100, and a cup-shape head front part as the second member 200.

The cup-shape head front part includes the face 2, a front portion 3b of the crown 3 and a front portion 4b of the sole 4 which portions extend from the face 2 toward the back side of the head.

The head rear part integrally includes a rear portion 3a of the crown 3, a rear portion 4a of the sole 4 and the hosel (not shown). In the front of the head rear part, an opening 303 is formed.

As explained above, the pedestal portion(s) 30 is/are provided on the inner surface 4i of the rear portion 4a of the sole 4 at position(s) accessible from the outside of the first member 100 through the opening 303.

In the case of the head main body 10 of the cup face type, as compared with the head main body 10 of the face open type or the crown open type, it is still difficult to form a space between the internal weight member 20 and the thin-wall portion 40 if the internal weight member 20 and the first member 100 are formed as monoblock casting, in particular, when the internal weight member 20 is provided with the downward protruding part 20A as shown in FIG. 15, or the internal weight member 20 is inclined downward toward the face 2.

However, in the manufacturing method of the present embodiment, the club head 1 having such space can be easily manufactured, and the cup-face type head main body can adopt various shapes for the internal weight member 20. Thus, it is possible to increase the degree of freedom in designing the club head 1 having the cup-face type head main body.

In the case of the cup-face type head main body 10, when the rear portion 4a and the front portion 4b of the sole 4 are connected with each other by welding, there is a possibility that, due to the weld bead, the welded part of the thin-wall portion 40 becomes thicker than the other part.

On the other hand, in the head main body 10 of the face open type or crown open type, it is possible to form the thin-wall portion 40 without the welded part, in other words, the thin-wall portion 40 remains thin. This is advantageous in improving the rebound performance.

In addition, when there is no welded part in the thin-wall portion 40, the degree of freedom in designing the thin-wall portion 40 is increased. For example, in order to promote the bending of the thin-wall portion 40, it is possible to form a groove or a slit in the thin-wall portion 40.

Further, according to the present invention, it may be possible that the head main body is of a sole opening type, namely, the sole 4 is provided with an opening.

Further, it is possible to constitute a golf club head according to the present invention by combining two or more of the above-described examples.

While detailed description has been made of preferable embodiments of the present invention, the present invention can be embodied in various forms without being limited to the illustrated embodiments.

DESCRIPTION OF THE REFERENCE SIGNS 1 golf club head
2 face
3 crown
4 sole
4i inner surface
10 head main body
20 internal weight member
20A downward protruding part
22 through hole
30 pedestal portion
31 first positioning part
32 second positioning part
32a protrusion
40 thin-wall portion
100 first member
200 second member
301 opening
302 opening
303 opening
321 main second positioning part
322 sub second positioning part
B welding bead
i hollow portion

The invention claimed is:

1. A method for manufacturing a golf club head, which is for the golf club head composed of: a head main body comprising a crown, a face and a sole and having a hollow portion therein; and an internal weight member disposed in the hollow portion, comprising:
 a preparing step of preparing a first member including at least a part of the sole, a second member, and the internal weight member;
 a first fixing step of fixing the internal weight member to said at least a part of the sole on the inner surface side thereof facing the hollow portion; and
 a second fixing step of fixing the second member to the first member to which the internal weight member has been fixed,
wherein
 the first member is provided, on said inner surface side, with a pedestal portion protruding toward the crown, and comprises a thin-walled portion extending between the pedestal portion and the face, having a smaller thickness than the pedestal portion,
 the pedestal portion is formed at a position accessible from the outside of the first member,
 the pedestal portion comprises a first positioning part for positioning the internal weight member in the up-down direction of the head, and a second positioning part for positioning the internal weight member in the toe-heel direction and/or front-back direction of the head,
wherein
 the first fixing step includes:
 a positioning step of positioning the internal weight member in relation to the pedestal portion by the use of the first positioning part and the second positioning part so that the internal weight member extends toward the face at a position above the thin-wall portion without contacting with the thin-wall portion and the face; and
 a internal weight member fixing step of fixing the positioned internal weight member to the pedestal portion.

2. The method for manufacturing a golf club head according to claim 1, wherein the second positioning part is configured to perform positioning of the internal weight member in both the front-back direction and toe-heel direction of the head.

3. The method for manufacturing a golf club head according to claim 2, wherein
 the second positioning part is a protrusion extending toward the crown, and
 the internal weight member is provided with a through hole receiving the protrusion.

4. The method for manufacturing a golf club head according to claim 3, wherein the amount of protruding of the protrusion is smaller than the depth of the through hole.

5. The method for manufacturing a golf club head according to claim 1, wherein
 the second positioning part is a protrusion extending toward the crown, and
 the internal weight member is provided with a through hole receiving the protrusion.

6. The method for manufacturing a golf club head according to claim 5, wherein the amount of protruding of the protrusion is smaller than the depth of the through hole.

7. The method for manufacturing a golf club head according to claim 6, wherein an annular gap having a V-shaped cross section is formed around the protrusion after the positioning step and before the internal weight member fixing step.

8. The method for manufacturing a golf club head claim 7, wherein the internal weight member fixing step includes forming a welding bead to extend between the second positioning part and the internal weight member to fix the internal weight member.

9. The method for manufacturing a golf club head according to claim 8, wherein
 the second positioning part includes a main second positioning part on which the welding bead is not formed, and a sub second positioning part on which the welding bead is formed, wherein a gap between the sub second positioning part and the internal weight member is larger than a gap between the main second positioning part and the internal weight member.

10. The method for manufacturing a golf club head according to claim 5, wherein an annular gap having a V-shaped cross section is formed around the protrusion after the positioning step and before the internal weight member fixing step.

11. The method for manufacturing a golf club head claim 5, wherein the internal weight member fixing step includes forming a welding bead to extend between the second positioning part and the internal weight member to fix the internal weight member.

12. The method for manufacturing a golf club head according to claim 11, wherein
 the second positioning part includes a main second positioning part on which the welding bead is not formed, and a sub second positioning part on which the welding bead is formed, wherein a gap between the sub second positioning part and the internal weight member is larger than a gap between the main second positioning part and the internal weight member.

13. The method for manufacturing a golf club head according to claim 1, wherein the thickness of the thin-wall portion is in a range from 0.9 to 1.5 mm.

14. The method for manufacturing a golf club head according to claim 1, wherein the internal weight member has a specific gravity larger than that of the head main body.

15. The method for manufacturing a golf club head according to claim 1, wherein the dimension in the toe-heel direction of the internal weight member is larger than the dimension in the front-back direction of the internal weight member.

16. The method for manufacturing a golf club head according to claim 1, wherein the internal weight member comprises a downward protruding part extending toward the sole and positioned on the face side of the pedestal portion.

17. The method for manufacturing a golf club head according to claim 1, wherein the first member includes said face which is provided with an opening.

18. The method for manufacturing a golf club head according to claim 1, wherein the first member includes said crown which is provided with an opening.

19. A golf club head having a crown, a face and a sole, and comprising:
   a head main body having a hollow portion therein, and
   an internal weight member disposed in the hollow portion,
wherein the sole is provided with a pedestal portion protruding toward the crown, and disposed on the inner surface side of the sole facing the hollow portion, and comprises a thin-wall portion extending between the pedestal portion and the face, having a thickness smaller than the pedestal portion, the internal weight member is fixed to the pedestal portion, and extends toward the face at a position above the thin-walled portion without contacting with the thin-walled portion and the face, wherein the head main body is formed from a first member provided with at least the pedestal portion, and a second member by fixing the second member to the first member, and the pedestal portion is disposed at a position accessible from the outside of the first member in a state of the second member before fixed to the first member, and the pedestal portion comprises a first positioning part for positioning the internal weight member in the up-down direction of the head, and a second positioning part for positioning the internal weight member in the front-back direction of the head and/or the toe-heel direction of the head.

* * * * *